UNITED STATES PATENT OFFICE.

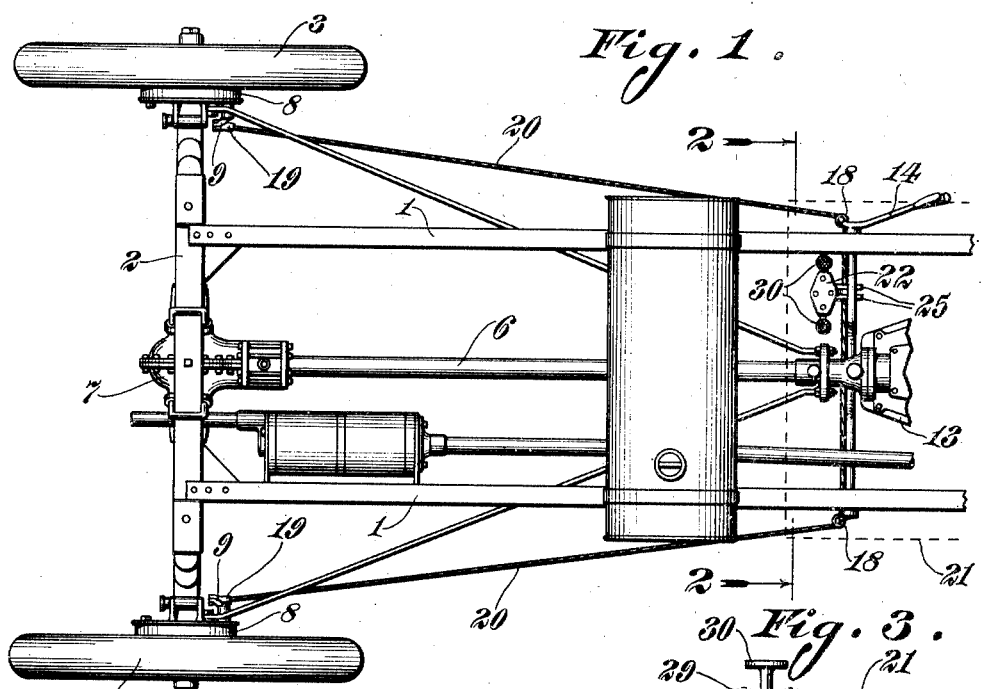
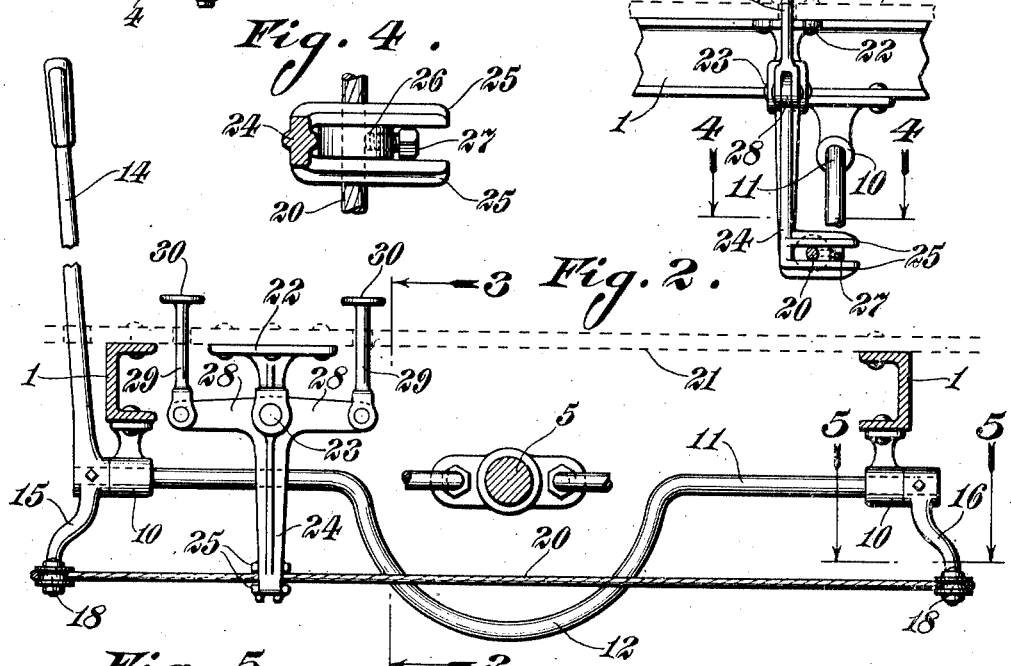
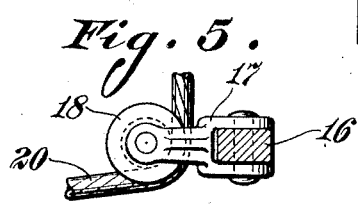

GEORGE A. BILGERE, OF ST. LOUIS, MISSOURI.

CONTROLLING MECHANISM FOR AUTOMOBILES.

1,334,345. Specification of Letters Patent. Patented Mar. 23, 1920.

Application filed November 15, 1918. Serial No. 262,698.

*To all whom it may concern:*

Be it known that I, GEORGE A. BILGERE, a citizen of the United States, and residing at St. Louis, Missouri, have invented the new and useful Improvement in Controlling Mechanism for Automobiles, of which the following is a specification.

This invention relates to automobiles, and more particularly to brake controlling mechanism therefor.

In an automobile, the power is transmitted from the drive shaft to the traction wheels through the medium of differential mechanism. When, however, one wheel is on a slippery surface, while the other is on solid ground, the first wheel is thereby caused to spin, and thus prevents the tractive force from being effectively applied to the traction wheels. This frequently happens when one of the rear wheels is in a mud hole.

One of the objects of this invention, therefore, is to provide mechanism whereby the traction wheels may be selectively braked to insure the application of the tractive force to the wheel which is not braked.

Another object is to provide novel brake controlling mechanism, which will equalize the setting of the brakes.

Further objects will appear from the detail description taken in connection with the accompanying drawing, in which:

Figure 1 is a detail plan of an automobile chassis and running gear, showing the controlling mechanism embodying this invention;

Fig. 2 is an enlarged section on the line 2—2, Fig. 1;

Fig. 3 is a section on the line 3—3, Fig. 2;

Fig. 4 is a section on the line 4—4, Fig. 3;

Fig. 5 is an enlarged section on the line 5—5, Fig. 2.

Referring to the accompanying drawing, 1 designates the side beams of the chassis, which are mounted on the rear springs 2, which in turn are mounted on the axle casing supported from the drive wheels 3 and 4. The power is applied to the drive wheels through the medium of a drive shaft 5 mounted in the drive shaft tube 6, and suitably connected to differential mechanism in the differential housing 7. The traction wheels are provided with brake drum 8, having suitable expanding brake shoes provided with operating arms 9. The mechanism so far described is of usual construction, the particular mechanism being that of the well-known Ford automobile.

Mounted in brackets 10 on the side beams 1 of the chassis is a rock shaft 11, which is curved downwardly at 12 to clear the drive shaft and the transmission casing 13. Fixed to this rock shaft is a hand lever 14, which extends upwardly so as to be operable by the chauffeur. The hand lever 14 has formed thereon or attached thereto a downwardly extending arm 15, while the other end of the rock shaft has fixed thereto a similar downwardly extending arm 16. Pivoted on the lower end of each arm is a clevis 17, which carries a roll 18. Pivoted to the ends of the arms 9 of the brakes are clevises 19 to each of which is attached in any suitable manner one end of an endless cable 20, which passes through the pulleys 18 carried by the arms 15 and 16. This cable, although being flexible, is strong enough so that it will not stretch.

The brake shoes are normally disengaged by springs or in any suitable manner as is usual in the type of automobile referred to. When, however, the hand lever 14 is rearwardly, it will operate to swing the rock shaft 11 and move the arms 15 and 16 thereon forwardly carrying the pulleys 18 and the cable with it. This will move the forwardly extending strands of the cable forwardly thereby setting both brakes. In view of the fact, however, that there is a loose connection between the cable and the rock shaft through the medium of the pulleys, the brakes are applied equally, the cable and pulleys providing an equalizing connection.

Mounted on the floor board 21 is a bracket 22 adapted to form a bearing. Pivoted at 23 in this bracket is a three armed lever, one arm 24 of which extends downwardly, and has a part 25 extending forwardly, and consisting of four prongs, the upper and lower pair of which embrace the transverse strands of the cable 20, and the lateral pair of which embrace a collar 26, secured to the cable strand by a set screw 27. The horizontal arms 28 of the three armed lever have pivoted to the ends thereof pedals 29, which extend upwardly through holes in the floor 21 and are provided at their upper ends with roughened heads 30, so as to be engageable by the heel of the foot. It will be noted that the part 25 is of considerable length so that upon operation of the hand lever 14, the cable can move forwardly to concurrently set both brakes.

The above mechanism provides means for selectively setting brakes to independently brake either traction wheel. If, for instance, the chauffeur desires to brake the right wheel 4, he will depress the right head 30 with the heel of his foot; this will swing the three armed lever so as to cause the arm 24 to move to the left, (Fig. 2) thereby moving the transverse cable strand to the left and moving the cable strand connected with the brake shoe of the right wheel 4 forwardly to apply this brake, while the left brake is left undisturbed. Similarly, the chauffeur can brake the left wheel 3 by depressing the left pedal 30, (Fig. 2). If now, for instance, one wheel, such as 4, is on a slippery surface, while the other wheel, such as 3, is on dry ground, the chauffeur can by the depression of the right pedal brake the right wheel sufficiently to apply the power to the left wheel in order to cause the effective traction thereof to pull the automobile out of the hole.

It will, therefore, be seen that the invention accomplishes its objects. Mechanism is provided whereby the chauffeur may selectively brake the traction wheels of the automobile, so as to apply the effective traction to the wheel which has a firm gripping engagement with the ground. Moreover, this mechanism is so coördinated with the usual brake that both brakes may be concurrently set for ordinary service. The equalizing connections are simple in construction, and effective in their action. Moreover, the mechanism is such that it can be readily applied to an existing automobile.

It is obvious that various changes may be made in the details of construction without departing from the spirit of this invention. It is, therefore, to be understood that this invention is not to be limited to the specific construction shown and described.

Having thus described the invention, what is claimed is:

1. In an automobile having a chassis, a drive shaft, traction wheels, differential mechanism connecting said shaft with said wheels, brakes coöperating with said wheels, an actuator arranged forwardly on said chassis, and connections extending from said actuator to said brakes adapted to concurrently set said brakes, and means independent of said actuator and operating on said connections contiguous said actuator, adapted to selectively set said brakes, substantially as and for the purpose set forth.

2. In an automobile having a drive shaft, traction wheels, and differential mechanism connecting said shaft with said wheels, brakes coöperating with said wheels, an uninterrupted connection between said brakes, means operating on said connection adapted to concurrently set said brakes, and independent means operating on said connection adapted to selectively set said brakes, substantially as and for the purpose set forth.

3. In an automobile having a drive shaft, traction wheels, and differential mechanism connecting said shaft with said wheels, brakes coöperating with said wheels, an uninterrupted connection between said brakes, and actuators operable independently on said connection, one actuator being adapted to concurrently set said brakes and the other actuator being adapted to selectively set said brakes.

4. In an automobile having a floor board, a drive shaft, traction wheels, and differential mechanism connecting said shaft with said wheels, brakes coöperating with said wheels, a hand lever adapted to concurrently set said brakes, and a pedal arranged on the floor board in position to be operated by the heel and connected to selectively set said brakes.

5. In an automobile having a drive shaft, traction wheels, and differential mechanism connecting said shaft with said wheels, brakes coöperating with said wheels, means connecting said brakes, and an actuator operable on said connecting means adapted to selectively set said brakes.

6. In an automobile having a drive shaft, traction wheels, and differential mechanism connecting said shaft with said wheels, brakes coöperating with said wheels, means connecting said brakes, and an actuator movable selectively in one or the other direction and operable on said connecting means adapted to selectively set said brakes.

7. In an automobile having a drive shaft, traction wheels, and differential mechanism connecting said shaft with said wheels, brakes coöperating with said wheels, means connecting said brakes, an actuator engaging said connecting means, and means for selectively operating said actuator adapted to selectively set said brakes.

8. In an automobile having a drive shaft, traction wheels, and differential mechanism connecting said shaft with said wheels, brakes coöperating with said wheels, means connecting said brakes, an actuator engaging said connecting means, and pedals connected to move said actuator adapted to selectively set said brakes.

9. In an automobile having a drive shaft, traction wheels, and differential mechanism connecting said shaft with said wheels, brakes coöperating with said wheels, an actuator, equalizing connections from said actuator to said brakes, adapted to cause said actuator to concurrently set said brakes, and means for selectively setting said brakes.

10. In an automobile having a drive shaft, traction wheels, and differential mechanism connecting said shaft with said wheels, brakes coöperating with said wheels, an actuator, equalizing connections from said actuator to said brakes, adapted to cause said actuator to concurrently set said brakes, and means operable on said connections adapted to selectively set said brakes.

11. In an automobile having a drive shaft, traction wheels, and differential mechanism connecting said shaft with said wheels, brakes coöperating with said wheels, a hand lever, equalizing connections from said hand lever to said brakes, adapted to cause said hand lever to concurrently set said brakes, and pedal means operable on said connections adapted to selectively set said brakes.

12. In an automobile having a drive shaft, traction wheels, and differential mechanism connecting said shaft with said wheels, brakes coöperating with said wheels, an actuator, equalizing connections from said brakes to said actuator, and means engaging said connections adapted to selectively set said brakes.

13. In an automobile having a drive shaft, traction wheels, and differential mechanism connecting said shaft with said wheels, brakes coöperating with said wheels, an actuator, a cable connecting said brakes with said actuator, and means engaging said cable adapted to selectively set said brakes.

14. In an automobile having a drive shaft, traction wheels, and differential mechanism connecting said shaft with said wheels, brakes coöperating with said wheels, a rock shaft, a cable connecting said brakes loosely with said rock shaft, a lever connected to rock said rock shaft, and pedal means engaging said cable adapted to selectively set said brakes.

In testimony whereof I affix my signature this 5th day of June, 1918.

GEORGE A. BILGERE.